United States Patent [19]

Johnson

[11] 3,772,767

[45] Nov. 20, 1973

[54] CASING JOINING

[75] Inventor: Douglas Johnson, Indianapolis, Ind.

[73] Assignee: General Motors Corporation, Detroit, Mich.

[22] Filed: Feb. 9, 1972

[21] Appl. No.: 224,900

Related U.S. Application Data

[62] Division of Ser. No. 858,698, Sept. 17, 1969, Pat. No. 3,655,223.

[52] U.S. Cl........................... 29/507, 29/423, 29/508, 29/511, 29/523
[51] Int. Cl......................... B21d 39/00, B23p 11/02
[58] Field of Search...................... 29/423, 507, 523, 29/508, 511; 285/39, 187, 330, 364–367, 285/371, 407–411, 420, 422; 287/189, 36 C, 111, 285/118

[56] References Cited
UNITED STATES PATENTS

| 880,507 | 3/1908 | Cook | 285/398 X |
|---|---|---|---|
| 3,287,034 | 11/1966 | Bragg | 29/511 X |

FOREIGN PATENTS OR APPLICATIONS

| 547,628 | 9/1956 | Italy | 285/366 |

*Primary Examiner*—Charles W. Lanham
*Assistant Examiner*—Victor A. DiPalma
*Attorney*—Paul Fitzpatrick et al.

[57] ABSTRACT

A gas turbine engine casing is joined at circumferential split lines by coupling members formed as rings having flanges which interlock with flanges on the casing sections to hold them against separation and having flanges which are deformed to bear directly or indirectly against the outer surface of the casing to hold the first flanges in engagement. The coupling ring as provided includes a third flange which provides an abutment or reaction surface for a tool which deforms the second flange. A heat shield may be provided on the coupling ring. The flange on the ring or key against which the force reacts may be removed after the joint is completed. The same sort of joint may be provided at axial or other split lines. (Disclosure incorporated by reference to parent application Ser. No. 858,698 filed Sept. 17, 1969, now U.S. Pat. No. 3,655,223.)

3 Claims, 4 Drawing Figures

PATENTED NOV 20 1973      3,772,767

CASING JOINING

This application is a division of my U.S. patent application Ser. No. 858,698 filed Sept. 17, 1969, now U.S. Pat. No. 3,655,223.

The invention herein described was made in the course of work under a contract with the Department of Defense.

SUMMARY OF THE INVENTION

My invention is directed to making joints between parts of walls or casings of various sorts, particularly those which contain a fluid under pressure such as pressure vessels, gas ducting, and the casings of gas turbine engines. The invention is particularly suitable to provide a lightweight, strong, rigid, readily applied joint between adjacent sections of the outer casing of a gas turbine engine, for example, and is so described herein. However, as will be apparent to those skilled in the art, the principles of my invention are applicable to various situations.

According to the preferred embodiment of my invention, the two parts to be joined have juxtaposed edges with flanges on one surface defining abutments spacing away from each other and abutments on the other surface facing toward each other. The abutments which face away from each other are coupled by recurved flanges on a coupling strip or ring which includes deformable flanges which directly or indirectly engage the other surface of the casing section. The recurved flanges hold the parts together against forces tending to separate them and the engagement with the abutments which face together holds them securely apart, preventing any rattle or shake in the joint when the pressure is not present. The coupling ring or strip includes a removable flange which provides a reaction surface for a forming tool which deforms the plastic flange to secure the connecting joint member and may thereafter be removed. The result is a strong, lightweight, compact, positive, relatively leakproof, semi-permanent joint which, however, may be taken apart by machining away parts of the coupling ring.

DETAILED DESCRIPTION OF THE INVENTION

Figure 1:
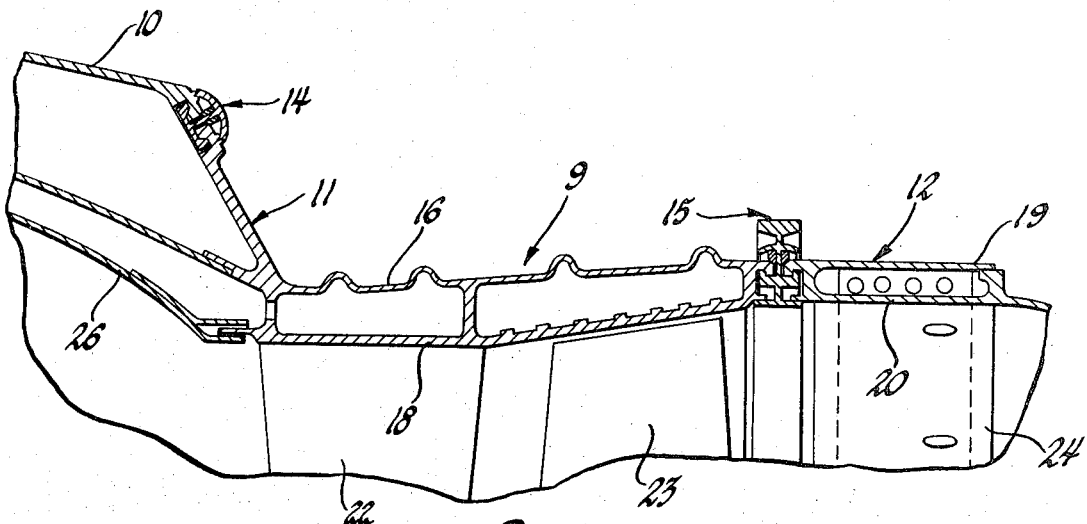
FIG. 1 is a fragmentary view of the casing of a turbojet engine taken in a plane containing the axis of rotation of the turbine and illustrating two applications of casing joints according to the invention.
Figure 2:
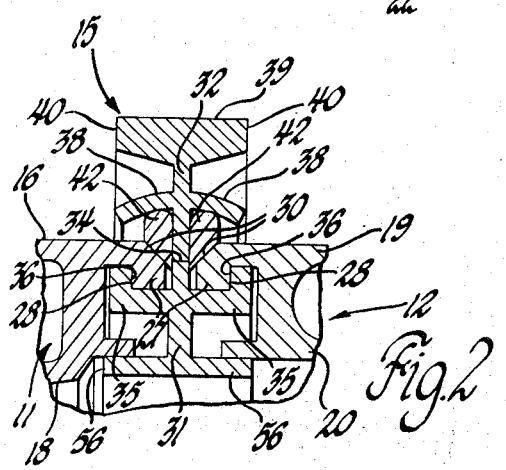
FIG. 2 is a cross-section of a joint which may be an enlarged view of a portion of FIG. 1.
Figure 4:
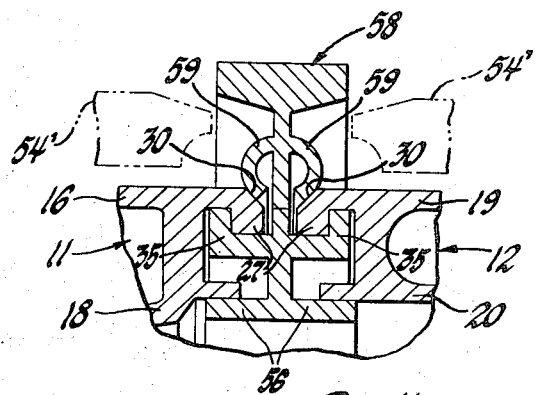
FIG. 4 is a view similar to FIG. 2 illustrating a modified form of joint structure.
Figure 3:
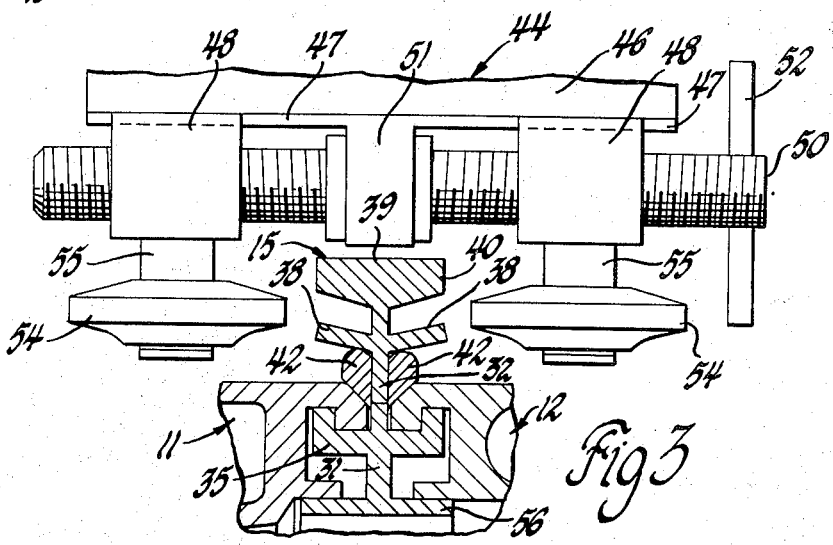
FIG. 3 is a view corresponding to FIG. 2 illustrating a step in the formation of the joint.

The Figures illustrate the joining method claimed herein and structure for implementing the method.

For a complete description of my invention as claimed herein, reference is made to my U.S. patent application Ser. No. 858,698 for Casing Joint filed Sept. 17, 1969, now U.S. Pat. No. 3,655,223.

Reference is made to the entire specification and drawings of Ser. No. 858,698 substantially all of which constitute a disclosure of the invention claimed herein. The disclosure of Ser. No. 858,698 is incorporated herein by reference and made a part hereof as if fully described herein.

I claim:

1. A method of connecting together two wall sections comprising providing abutments on one surface of the sections facing away from the edge of the sections; providing a coupling strip having a web, having recurved flanges extending from both faces of the web adapted to interlock with the said abutments, having second flanges extending from both faces of the web adapted to overlie the other surface of the sections, and having third flanges extending from both faces of the web overlying the second flanges; juxtaposing the edges of the sections with the strip between them; interlocking the first flanges with the abutments; and exerting a separating force between the second and third flanges so as to deform the second flanges toward the sections.

2. A method as recited in claim 1 including also the step of inserting filler strips between the second flanges and the wall sections before deforming the second flanges.

3. A method of connecting together two casing sections comprising providing abutments on one surface of the sections facing away from the ends of the sections; providing a coupling ring having a web, having recurved flanges extending from both faces of the web adapted to interlock with the said abutments, having second flanges extending from both faces of the web adapted to overlie the other surface of the sections, and having third flanges extending from both faces of the web overlying the second flanges; juxtaposing the ends of the sections with the ring between them; interlocking the first flanges with the abutments; exerting a separating force between the second and third flanges so as to deform the second flanges toward the sections; and removing the third flanges and at least the major portion of the web between the second and third flanges.

* * * * *